United States Patent [19]

Khazam

[11] Patent Number: 5,027,298

[45] Date of Patent: Jun. 25, 1991

[54] LOW-DEAD-TIME INTERVAL TIMER

[75] Inventor: Moses Khazam, Lexington, Mass.

[73] Assignee: GenRad, Inc., Concord, Mass.

[21] Appl. No.: 373,993

[22] Filed: Jun. 29, 1989

[51] Int. Cl.[5] .......................... G04F 8/00; G06F 15/20

[52] U.S. Cl. .................................... 364/569; 368/120; 328/129.1; 377/20

[58] Field of Search ............................... 364/569, 900; 328/129.1; 377/20; 368/10, 89, 115–120

[56] References Cited

U.S. PATENT DOCUMENTS

| | | | |
|---|---|---|---|
| 3,970,828 | 7/1976 | Klein | 377/20 |
| 4,142,680 | 3/1979 | Oswald et al. | 377/20 |
| 4,168,525 | 9/1979 | Russell | 364/569 |
| 4,186,298 | 1/1980 | Kinbara | 377/4 |
| 4,192,130 | 3/1980 | Takeuchi | 368/155 |
| 4,303,983 | 12/1981 | Chaborski | 369/569 |
| 4,517,684 | 5/1985 | Fennel | 377/19 |
| 4,584,528 | 4/1986 | Ohmae et al. | 377/20 X |
| 4,606,058 | 8/1986 | Kruger et al. | 328/129.1 X |
| 4,613,951 | 9/1986 | Chu | 377/20 X |
| 4,678,345 | 7/1987 | Agoston | 377/20 X |
| 4,823,293 | 4/1989 | Oda | 364/569 |
| 4,908,784 | 3/1990 | Box et al. | 368/120 |

*Primary Examiner*—Joseph L. Dixon

*Attorney, Agent, or Firm*—Cesari and McKenna

[57] ABSTRACT

A time-interval meter (10) employs a counter (16) to count the number of cycles of the output of an oscillator (18) that occur between a pulse on a start input line (12) and a subsequent pulse on a stop input line (14). The result is a coarse measurement. A filter (28) filters the output of the oscillator (18) to produce a sinusoidal signal, and the meter (10) refines the coarse measurement by employing analog-to-digital converters (20 and 22) to measure the values assumed by the sinusoidal signal at the occurrences of the start and stop pulses. A calculation circuit (24) employs an inverse trigonometric function of the converter outputs to determine the difference between the phases of the sinusoidal signal at the occurrences of the start and stop pulses, and it adds the time difference associated with this phase difference to the coarse measurement indicated by the cycle count to yield a total interval duration.

28 Claims, 4 Drawing Sheets

FIG. 2a FILTER
FIG. 2b START
FIG. 2C STOP

LOW-DEAD-TIME INTERVAL TIMER

BACKGROUND OF THE INVENTION

The present invention is directed to interval timers.

There are many applications in which it is desired to measure the time interval between two events. The occurrences of the events are typically indicated by start and stop trigger signals. A common method of making such a measurement is to provide a counter and a high-frequency clock signal and to gate the clock signal to the counter with a gating signal that begins on the occurrence of the start trigger and ends on the occurrence on the stop trigger. The counter output at the end of the timing interval is then an indication of the length of the interval.

In this method, it is the period of the clock signal that determines the resolution with which the interval can be measured. Speed limitations of available counters impose limitations on the shortness of the clock period. However, various methods have been employed to increase the resolution over that provided by the counter output alone. In most such arrangements, a high-current source charges a capacitor from the beginning of a clock interval until the occurrence of a trigger pulse. The capacitor is then discharged with a small current, and the discharge interval is timed. This "stretches" the interval between the last clock pulse and the trigger signal so that the interval is measured with greater resolution.

Unfortunately, pulse-stretching techniques result in significant dead time; the system cannot make a new interval measurement while the capacitor is slowly discharging. Moreover, measurements made near the beginning of a clock-pulse interval are subject to inaccuracies because switching transients can cause nonlinearities in capacitor charging.

SUMMARY OF THE INVENTION

The present invention greatly reduces dead time, and it is not subject to the switching transients with which pulse-stretching arrangements are afflicted. According to the present invention, a sinusoidal reference signal either provides or is synchronized with the clock transitions that increment the counter. Start and stop triggers begin and end the gating of counter clock pulses in the usual manner. Additionally, however, the start trigger causes an analog-to-digital converter to sample the value that the sinusoidal signal assumes at the time of the start trigger. The sinusoidal signal is similarly sampled upon the occurrence of the stop trigger, and inverse trigonometric functions are employed to determine the phases of the sinusoidal signal at the beginning and end of the interval. The difference between these phases serves as a fine measurement, which is added to the coarse measurement that results from the counter output. Since the sinusoidal signal can be generated with relatively high accuracy and is constantly in a steady state, transient effects are not a problem. Moreover, since no pulse stretching occurs, the dead time is limited only by the time required to sample and/or convert the value of the sinusoidal signal.

BRIEF DESCRIPTION OF THE DRAWINGS

These and further features and advantages of the present invention are described in connection with the accompanying drawings, in which:

FIGS. 2*a*–*e* are plots of signals present at various points in the circuit of FIG. 1;

DETAILED DESCRIPTION OF ILLUSTRATIVE EMBODIMENTS

Figure 1:
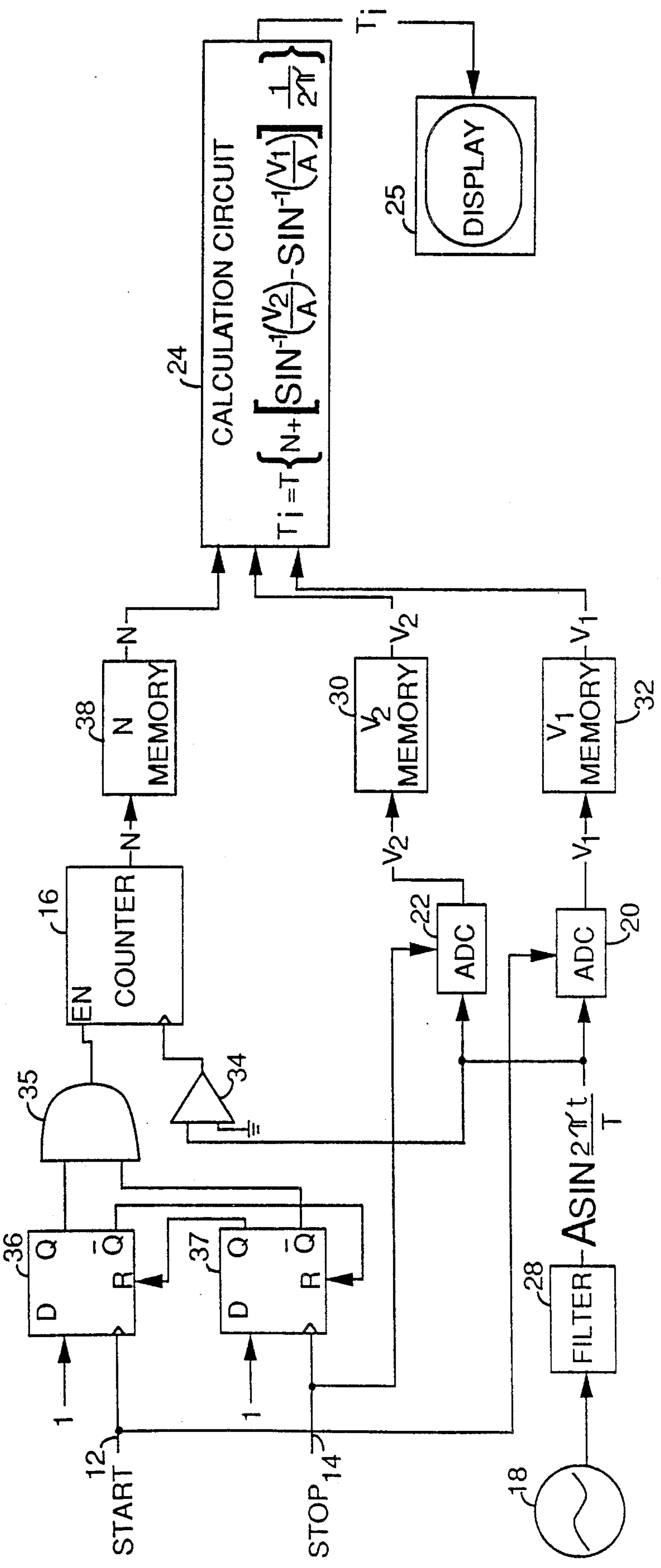
FIG. 1 is a block diagram of a simple embodiment of the present invention.

The interval timer 10 depicted in FIG. 1 measures the duration of an interval defined by START and STOP signals on lines 12 and 14. A counter 16 provides a coarse duration measurement by counting the number of cycles of an oscillator 18 that occur within the interval. To refine the duration measurement, the timer 10 employs a pair of analog-to-digital converters 20 and 22, which make measurements from which the phases of the oscillator signal at the occurrence of the START and STOP pulses can be determined. Calculation circuitry 24, typically a microprocessor, then uses the outputs of the counter 16 and the two analog-to-digital converters 20 and 22 to determine the interval duration $T_i$.

The interval timer 10 of FIG. 1 bases its fine-measurement operation on a sine-wave reference signal, which is advantageous because a sine wave can be produced more cleanly and easily at high frequencies than signals of other shapes can. The timer 10 may employ a class-A oscillator, whose output is naturally a relatively clean sine wave. More typically, the timer would employ a more-conventional oscillator 18 and use a low-pass or band-pass filter 26 to remove the harmonics present in the oscillator output. The filter output is the clean sine wave depicted in FIG. 2*a*, and the analog-to-digital converters 20 and 22 sample and convert to digital form the values that the filter output signal assumes at the leading edges of the start and stop signals depicted respectively in FIGS. 2*b* and 2*c*. The analog-to-digital converters 20 and 22 store these values, which we will refer to as $V_1$ and $V_2$, in respective $V_1$ and $V_2$ memories 30 and 32.

The phases of the filter output at the beginning and the end of the interval can be determined from the $V_1$ and $V_2$ values by using inverse trigonometric functions; that is, the phases at the beginning and the end of the interval are arcsin $V_1$ and arcsin $V_2$. The interval timer 10 makes the fine-measurement part of the interval determination by subtracting the phase measurements.

Figures 2D, 2E:
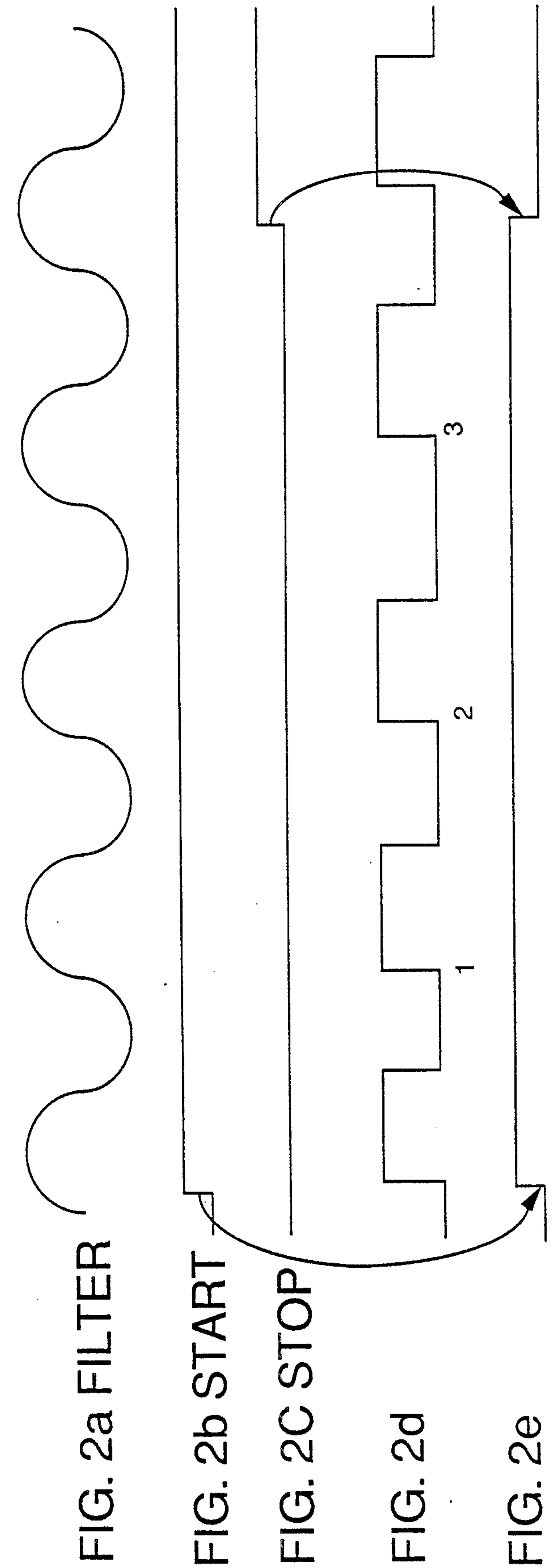

To make the coarse-measurement part of the duration determination, the timer 10 employs a comparator 34, which receives the filter output and converts it into a square wave, depicted in FIG. 2*d*, that the counter 16 uses as its increment signal. The oscillator 18 and filter 28 thus serve not only as a reference-signal source but also, together with the comparator 34, as a clock, the clock pulses coinciding with the undulations of the filter output. Although the comparator 34 is shown as comparing the filter output with a ground reference level, those skilled in the art will recognize that it may be desirable to compare it with a different reference, typically a voltage slightly below ground, to compensate for inaccuracies that might otherwise occur because of delays in the comparator 34 and/or counter 16.

The counter 16 receives its enable signal from an AND gate 35, whose inputs are the Q output of a D-type start flip-flop 36 and the Q-complement output of a D-type stop flip-flop 37. The start and stop flip-flops 36 and 37 are interconnected so that the reset input of the stop flip-flop 37 is the Q-complement output of the start flip-flop 36, while the reset input of the start flip-flop 36 is the Q output of the stop flip-flop 37.

Initially, flip-flops 36 and 37 are both in their reset state, so the high Q-complement output of the start flip-flop 36 keeps the stop flip-flop 37 disabled, but the low Q output of the stop flip-flop 37 does not disable the start flip-flop 36. Accordingly, when the start flip-flop 36 receives a trigger pulse in its clock input, namely, the START signal, its high D input causes the start flip-flop 36 to go high and enable the AND gate 35, thereby causing the counter 16 to begin counting its clock pulses.

The setting of the start flip-flop 36 also results in a low value of its Q-complement output, which thereby enables the stop flip-flop 37 to respond to a stop trigger. When the stop trigger arrives, the Q-complement output of the stop flip-flop 37 goes low and thereby disables the AND gate 35, whose output thereby causes the counter 16 to stop counting clock pulses. FIG. 2*e* depicts the output of the AND gate 35. The counter 16 stores the resultant count, which we will refer to as N, in an N memory 38.

To compute the duration $T_i$ of the interval, the calculation circuit 24 fetches the values N, $V_1$, and $V_2$ and computes $T_i$ in accordance with the following formula:

$$T_i = \{N + [\arcsin(V_2/A) - \arcsin(V_1/A)]/2\pi\}T, \ k$$

where T is the oscillator period and A is the amplitude of the filter output.

The arrangement of FIG. 1 greatly reduces dead time because the reference signal used for the fine-measurement operation simply operates in a steady-state manner; unlike the capacitor charged in pulse-stretching systems, it does not have to be initialized after each measurement. Although some time is required to calculate the duration, such calculations do not have to be performed in real time; the raw data $V_1$, $V_2$, and N are stored in the memories 30, 32, and 38, respectively, and these memories can be sized to contain a plurality of measurements.

The dead time therefore is at most the convert time of the analog-to-digital converters 20 and 22, and there typically is no dead time at all. Specifically, if the first digital-to-analog converter 20 completes its conversion before the subsequent pulse in the STOP signal occurs, the next interval measurement can begin immediately--i.e., there is no dead time--and the meter can thus be used for purposes such as digital FM demodulation, in which the duration of each cycle is measured. Moreover, convert times can be made very small if the analog-to-digital converters are "flash converters." An n-bit flash converter is one that makes comparisons with $2^n$ voltage references simultaneously rather than with n reference voltages sequentially.

Although my invention as embodied in the interval timer of FIG. 1 provides significant dead-time advantages, it can require a relatively high analog-to-digital-converter resolution for a given desired duration resolution. Specifically, the value of the sine wave changes only very slightly with time when its phase is near $\pi/2$ or $3\pi/2$. Thus, a much higher analog-to-digital-conversion resolution is required to obtain a given interval-measurement resolution near those phases than is required near 0 and $\pi$. For this reason, it may be preferable in some situations to embody my invention in an arrangement of the type depicted in FIG. 3, which uses two sine waves, one of which is 90° out of phase with the other so that one will be in the high-resolution part of its curve if the other is in the low-resolution part.

Figure 3:
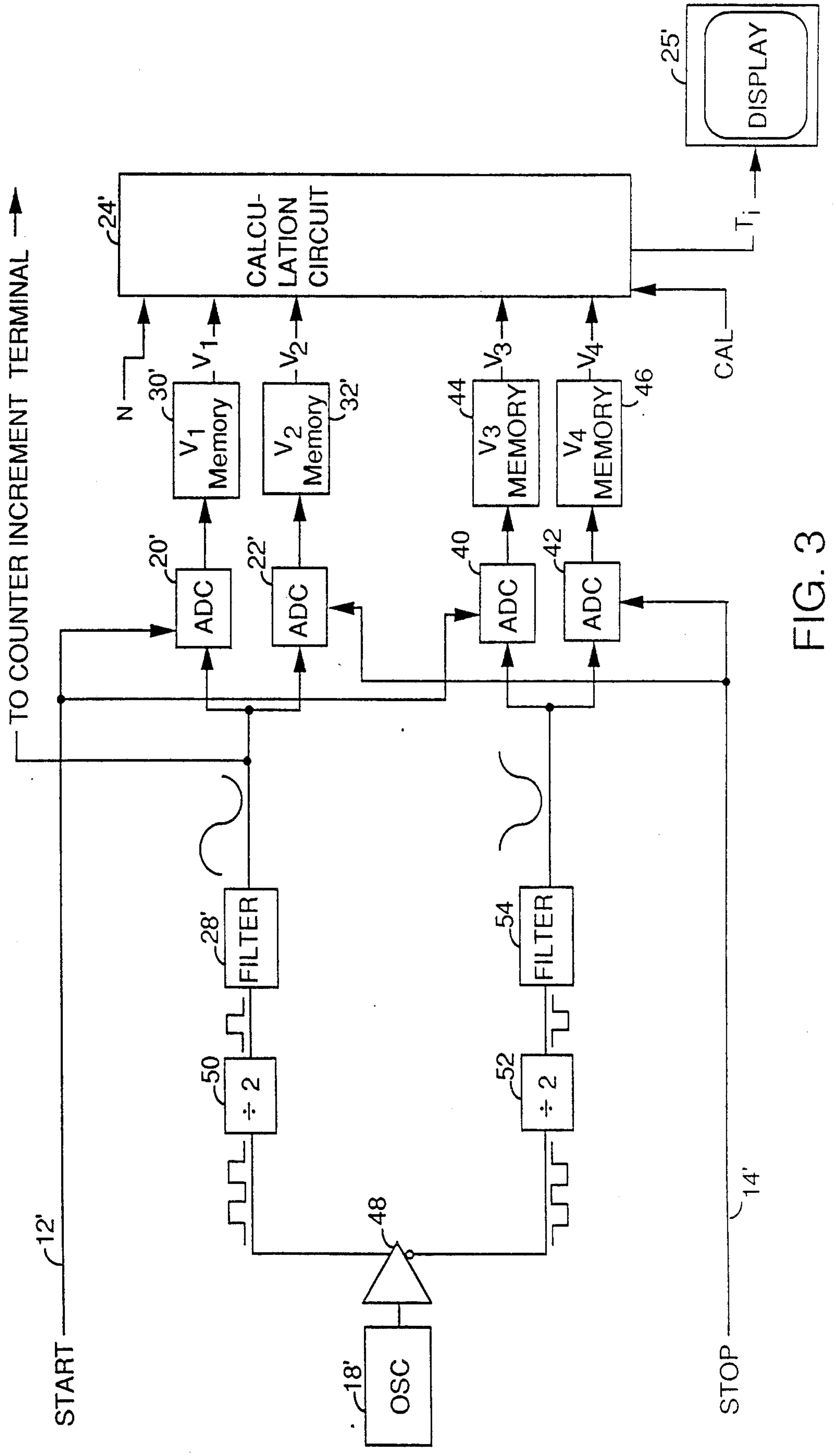
FIG. 3 is a block diagram of part of another embodiment of the present invention.

FIG. 3 does not show the part of the circuitry for determining the value of N, since that part is the same as in the embodiment of FIG. 1. FIG. 3 does show analog-to-digital converters 20' and 22' and memories 30' and 32', which together generate outputs $V_1$ and $V_2$ in a manner the same as that in which the elements with corresponding unprimed reference numerals in FIG. 1 generate them. In addition, the arrangement of FIG. 3 includes a parallel combination of analog-to-digital converters 40 and 42 and memories 44 and 46, which operate in a manner the same as that in which corresponding elements 20', 22', 30', and 32' operate, with the exception that the sinusoidal signal that they receive is in quadrature with the sinusoidal signal that analog-to-digital converters 20' and 22' receive. These two phase-quadrature signals can be generated in any desired manner, one of which is depicted in FIG. 3.

In FIG. 3, an oscillator 18' drives a high-speed buffer 48, which generates complementary square-wave outputs. Two divide-by-two circuits 50 and 52 receive these square waves and toggle on each positive-going transition. Each divide-by-two circuit thereby divides the frequency of its input by two. The result is two square waves that are 90° out of phase with each other, and filters 28' and 54 remove the harmonics from these signals to produce sine-wave outputs in phase quadrature. One of these outputs, namely, that of filter 28', increments the counter just as the output of filter 28 of FIG. 1 does.

The calculation circuit could operate in manner essentially the same as that employed by the calculation circuit 24 of FIG. 1. Specifically, it could use essentially the same formula to determine the duration $T_i$ of the time interval. The difference would be that, whenever the absolute value of $V_1$ or $V_2$ is greater than, say, 85% of its peak value, the calculation circuit 24' would determine arcsin $V_1$ or arcsin $V_2$ indirectly by substituting arccos $V_3$ or arccos $V_4$. In this way, the resolution of the system would not suffer when the beginning or end of the transition happens to occur during a low-resolution part of one of the reference signals.

However, one might employ a different formula, which enables the system to be calibrated for differences in reference-signal amplitudes and for differences in the delays imposed by filters 28' and 54. To explain the alternate method of calculation, we assume that the sinusoidal signals that filters 28' and 54 produce are out of phase quadrature by a phase error p and that their amplitudes differ. To compensate for these factors, the user calibrates the system from time to time, say, once per week.

To calibrate the system, the user applies a CAL signal to the calculation circuit to cause it to assume a calibration mode. He then applies START and STOP signals separated by a known phase difference f. The resultant voltage measurements are given by the following expressions if the START pulse for the calibration interval occurs when the output of filter 28' has a phase x:

$$V_1 = A_1 \sin x \quad (1)$$

$$V_2 = A_1 \sin (x + f) \quad (2)$$

$$V_3 = A_2 \cos(x+p) \quad (3)$$

$$V_4 = A_2 \cos(x+p+f) \quad (4)$$

where $A_1$ and $A_2$ are the peak values of the outputs of filters 28′ and 54, respectively. It may be necessary to perform the measurement step more than once; a perusal of equations (5) and (6) below reveals that it is desirable to avoid values of x for which the values of $V_1$ and/or $V_3$ are near zero.

The goal of the calibration operation is to determine the values of the phase error p and the amplitude ratio $A_1/A_2$. The first step in this determination is to find x, the phase of the reference signal when the STOP pulse was received. If we rewrite equation (2) by using the trigonometric identity for the sine of a sum, divide the result by equation (1), and rearrange terms, we obtain:

$$\cot x = (V_2/V_1 \sin f) - \cot f. \quad (5)$$

Clearly, x is the inverse cotangent of the expression on the right side of equation (5).

We then rewrite equation (4) by using the trigonometric identity for the cosine of a sum, divide by equation (3), and rearrange terms to yield the following equation:

$$\tan(x+p) = \cot f - V_4/V_3 \sin f. \quad (6)$$

By subtracting the value of x derived from equation (5) from the inverse tangent of the expression on the right side of equation (6), we obtain the value for the phase error p. Once p is known, the ratio $A_1/A_2$ can readily be determined.

The user then releases the CAL signal, and the timer 10′ is ready to determine the duration $T_i$ of the interval defined by the next START and STOP pulses. When the next START and STOP pulses occur, the timer makes measurements of $V_1$, $V_2$, $V_3$, and $V_4$ as before, and it uses the calibration values p and $A_1/A_2$ to determine the phases $p_1$ and $p_2$ that the reference output of filter 28′ assumes upon the occurrences of the START and STOP pulses, respectively.

Specifically, it determines these phases in accordance with the following formulas:

$$p_1 = \arctan(\tan p + A_1V_3/A_2V_1 \cos p) \quad (7)$$

$$p_2 = \arctan(\tan p + A_1V_4/A_2V_2 \cos p). \quad (8)$$

The timer then employs the number N of count pulses received during the interval to compute the total duration:

$$T_i = [(N + p_2 - p_1)/2\pi]T.$$

The arctangent function, employed in equations (7) and (8), is single-valued only if its range is limited to $\pi$. For the calculations here, of course, the range must be $2\pi$, so the arctangent function is double-valued. For this reason, the polarity of one of the measurements will be used to determine which of the values to employ.

To simplify illustration of the principle that the invention employs, the embodiments of FIGS. 1 and 3 are arranged with their oscillator and sinusoid frequencies equal. However, the teachings of the present invention can also be practiced in arrangements in which the clock frequency is, say, a multiple of the sinusoid frequency. In fact, there are practical reasons why the use of a higher clock frequency may be preferable.

Figure 4:
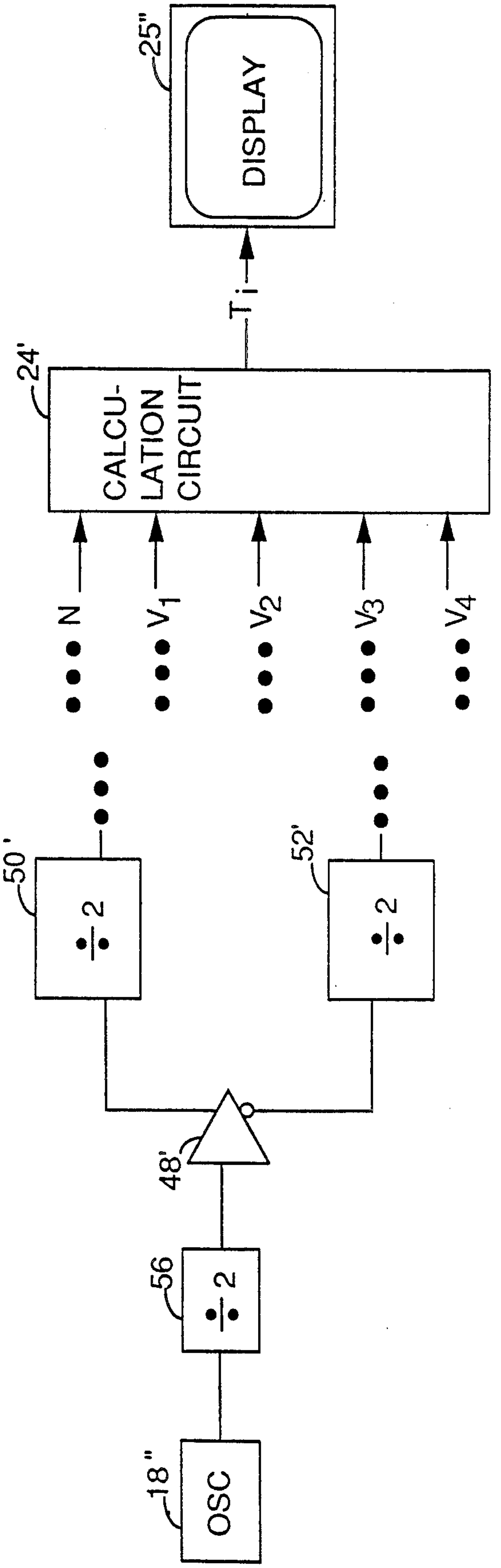
FIG. 4 is a block diagram of part of a third embodiment of the present invention.

Consider an event that occurs when the sinusoid phase is 0, i.e., an event that is coincident with a clock transition. In such a situation, the counter may or may not count the clock pulse that coincides with the event. The measured phase at the START event is 0, and we will assume that the measured phase at the STOP event is $\pi/4$ and that the counter output N is 1. In the arrangements of FIGS. 1 and 3, such measurements indicate that the time interval between the START and STOP triggers is 1.125 times the clock period. Since the phase measurement at the START event was 0, however, the counter might have counted the clock pulse that coincided with the START event, and the interval may actually only have been 0.125 times the clock period. If the START and STOP events both occur very near to clock transitions, the counter may count neither, one, or both of the nearly coincident transitions. This results in three possible counts for essentially the same-duration time interval. Every combination of actual duration and measured phase difference is thus associated with a group of two or three possible counts. When the clock and sinusoid frequencies are equal, this results in ambiguity because a group associated with a given phase difference can have a count in common with another group associated with the same phase difference but a different actual duration. If the clock frequency is four times the frequency of the sinusoidal reference signal, however, no two groups of possible counts associated with a given measured phase difference have any counts in common, so the result is unambiguous. FIGS. 4 and 5 illustrate an embodiment for taking advantage of this effect.

FIG. 4 depicts a replacement for the part of the circuit of FIG. 3 upstream of the filters 28′ and 54. In FIG. 4, the output of the oscillator 18″ is the counter clock input. In this particular, the arrangement of FIG. 4 differs from that of FIG. 3, since in FIG. 3 it is the output of filter 28′ rather than of oscillator 18′ that provides the counter increment signal. That is, the clock signal is the same as one of the sinusoidal reference signals in the FIG. 3 arrangement, while the clock and reference signals in FIG. 4 are different and, indeed, are of different frequencies, although they are in synchronism with each other.

The arrangement of FIG. 4 further differs from that of FIG. 3 in that the arrangement of FIG. 4 includes a divide-by-two circuit 56 interposed between its oscillator 18″ and its high-speed buffer 48′. The functions of the high-speed buffer 48′ and two divide-by-two circuits 50′ and 52′ are the same as those of the high-speed buffer 48 and divide-by-two circuits 50 and 52 of FIG. 3, and subsequent circuitry not shown in FIG. 4 performs functions substantially identical to the subsequent circuitry of FIG. 3. A further difference is that the calculation circuit 24″ of FIG. 4 employs a different calculation routine. The purpose of the difference in calculator routines is to take advantage of the fact that the counter clock frequency is four times the sinusoid frequency.

Specifically, the calculation circuit 24″ of FIG. 4 employs substantially the same formula for determining the time interval, but it replaces the counter output N in that formula with a new coarse-duration quantity N′ determined in accordance with the following formula:

$$N' = \mathrm{trunc}[(N+2)/4 - (p_2 - p_1)/2\pi],$$

where trunc(x) is the integer part of x; e.g., trunc(2½)=2. This formula serves as a sort of error-correcting routine; it takes into account the fact that, for any phase difference, there is a group of two or three possible values of N that can result from the same number of complete sinusoid periods. It implicitly assigns a single value of N' to each group of two or three values of N, identifies the group into which N falls, and uses the single value of N' associated with that group to calculate the interval duration.

For example, suppose that the START and STOP events are separated by almost exactly two periods of the sinusoid. Suppose further that the measured starting phase $p_1$ is very near to 0 and the measured stop phase $p_2$ is very near to $2\pi$. The START and STOP pulses then would both very nearly coincide with clock pulses, and the counter could be incremented by one, both, or neither of the coincident clock pulses. There are thus three possible values for N: 7, 8, and 9.

Since the value of $p_2-p_1$ is almost $2\pi$, however, the formula for N' yields a value of unity regardless of whether N is 7, 8, or 9. The single sinusoid period represented by $N'=1$, together with the single period represented by the phase difference of $2\pi$, yields the proper two-period interval when employed in the formula for $T_i$.

Consider another example, this one being the reverse of the previous one. In this example, the values of $p_1$ and $p_2$ are reversed: the first event occurs on a phase of nearly $2\pi$, while the second event occurs on a phase of nearly 0. Assume again that the time interval is almost exactly two sinusoid periods. In this case, the possible values for N are again 7, 8, and 9, but the value of $p_2-p_1$ is $-2\pi$ rather than $2\pi$. Accordingly, the formula for N' yields a value of 3 rather than 1. The resultant value of $T_i$ remains the same, however, because the phase difference in this example is $-2\pi$ rather than $2\pi$, so the single sinusoid period represented by this value is subtracted from, rather than added to, the value of N'.

It is apparent from the foregoing description that the general concept of refining an interval measurement by using a sinusoidal reference and employing an inverse trigonometric function of its values at the beginning and end of the interval can be employed in a wide range of embodiments that differ from the specific embodiments illustrated above. For instance, although both of the embodiments above employ different analog-to-digital converters for the START and STOP signals, such an arrangement is not necessary; the same converter can be used for both. Additionally, it will be apparent that one can employ the teachings of the present invention not only with the inverse trigonometric functions mentioned above but also with others. The present invention thus constitutes a significant advance in the art.

I claim:

1. A method of measuring the duration of an interval defined by a start trigger and a stop trigger, the method comprising the steps of:

A) providing a clock signal comprising pulses that occur at a predetermined frequency;

B) providing at least one temporally sinusoidal reference signal synchronous with the clock signal;

C) receiving start and stop triggers;

D) measuring the value of each said reference signal at the occurrence of the start trigger;

E) counting the number of pulses of the clock signal that occur between the start and stop triggers;

F) measuring the value of the at least one reference signal at the occurrence of the stop trigger;

G) applying inverse trigonometric functions to the measured reference-signal values to determine the difference between the phase at the start trigger and the phase at the stop trigger of each said reference signal;

H) computing the duration of the time interval between the start trigger and the stop trigger from the counted number of clock-signal pulses and the determined phase difference; and I) generating a duration signal indicative of the duration thus computed.

2. A method as defined in claim 1 wherein:

A) the step of providing at least one sinusoidal reference signal comprises providing first and second sinusoidal reference signals of the same frequency, each reference signal being synchronous with the clock signal but out of phase with the other reference signal;

B) the step of measuring the value of the at least one reference signal at the occurrence of the start trigger comprises measuring the values of the first and second reference signals at the occurrence of the start trigger;

C) the step of measuring the value of the at least one reference signal at the occurrence of the stop trigger comprises measuring the values of the first and second reference signals at the occurrence of the stop trigger; and D) the step of applying inverse trigonometric functions to the measured reference values comprises applying the inverse trigonometric functions to quantities including the value of the first reference signal at the occurrence of at least one of the start trigger and the stop trigger and the value of the second reference signal at the occurrence of at least the other of the start trigger and the stop trigger.

3. A method as defined in claim 2 wherein the step of applying the inverse trigonometric functions comprises computing the difference between an inverse trigonometric function of a linear function of the ratio of the values of the first and second reference signals at the occurrence of the start trigger and an inverse trigonometric function of a linear function of the ratio of the values of the first and second reference signals at the occurrence of the stop trigger.

4. A method as defined in claim 3 wherein the inverse trigonometric function is the inverse tangent.

5. A method as defined in claim 2 wherein the frequency of the clock signal is a multiple of that of the sinusoidal reference signal.

6. A method as defined in claim 5 wherein:

A) the method further comprises associating a plurality of predetermined groups of possible numbers of clock pulses with each value of phase difference and associating a single coarse duration with each group; and B) the duration-computing step comprises identifying the group, associated with the measured phase difference, into which the counted number of clock-signal pulses falls and adjusting by the measured phase difference the coarse duration associated with the identified group.

7. A method as defined in claim 1 wherein the frequency of the clock signal is a multiple of that of the sinusoidal reference signal.

8. A method as defined in claim 7 wherein:

A) the method further comprises associating a plurality of predetermined groups of possible numbers of clock pulses with each value of phase difference and associating a single coarse duration with each group; and B) the duration-computing step comprises identifying the group, associated with the measured phase difference, into which the counted number of clock-signal pulses falls and adjusting by the measured phase difference the coarse duration associated with the identified group.

9. For measuring the duration of an interval defined by a start trigger and a stop trigger, an apparatus comprising:

A) a clock for generating pulses that occur with a predetermined frequency;

B) a reference-signal source providing at least one temporally sinusoidal reference signal synchronous with the clock signal;

C. means for receiving the start and stop triggers;

D) analog-to-digital-converter means, responsive to the means for receiving start and stop triggers, for receiving the at least one reference signal and measuring values thereof at the occurrences of the start and stop triggers and generating converter outputs representative thereof;

E) a counter for counting the number of pulses of the clock signal that occur between the start and stop triggers and generating a counter output representative thereof; and F) calculation means, responsive to the converter and counter outputs, for applying inverse trigonometric functions to the converter outputs, making a determination of the difference between the phase at the start trigger and the phase at the stop trigger of each said reference signal, computing the duration of the time interval between the start trigger and the stop trigger from the counter output and the determined phase difference, and generating a duration signal representative of the time interval.

10. An apparatus as defined in claim 9 wherein:

A) the reference-signal source comprises means for providing first and second sinusoidal reference signals of the same frequency synchronous with the clock signal but out of phase each other;

B) the analog-to-digital-converter means measures the values of the first and second reference signals at the occurrences of the start and stop triggers; and C) the calculation means comprises means for making the phase-difference determination by applying the inverse trigonometric functions to quantities including the value of the first reference signal at the occurrence of at least one of the start trigger and the stop trigger and the value of the second reference signal at the occurrence of at least the other of the start trigger and the stop trigger.

11. An apparatus as defined in claim 10 wherein the means for applying the inverse trigonometric functions comprise means for computing the difference between an inverse trigonometric function of a linear function of the ratio of the values of the first and second reference signals at the occurrence of the start trigger and an inverse trigonometric function of a linear function of the ratio of the values of the first and second reference signals at the occurrence of the stop trigger.

12. An apparatus as defined in claim 11 wherein the means for applying the inverse trigonometric functions comprise means for computing the difference between the inverse tangent of a linear function of the ratio of the values of the first and second reference signals at the occurrence of the start trigger and the inverse tangent of a linear function of the ratio of the values of the first and second reference signals at the occurrence of the stop trigger.

13. An apparatus as defined in claim 10 wherein the clock generates a clock signal whose frequency is a multiple of the frequency of the reference signal.

14. An apparatus as defined in claim 13 wherein the calculation means comprise means for associating a plurality of predetermined groups of possible numbers of clock pulses with each value of phase difference and associating a single coarse duration with each group, identifying the group, associated with the measured phase difference, into which the counted number of clock-signal pulses falls, and computing the time-interval duration by adjusting by the measured phase difference the coarse duration associated with the identified group.

15. An apparatus as defined in claim 9 wherein the clock generates a clock signal whose frequency is a multiple of the frequency of the reference signal.

16. An apparatus as defined in claim 15 wherein the calculation means comprise means for associating a plurality of predetermined groups of possible numbers of clock pulses with each value of phase difference and associating a single coarse duration with each group, identifying the group, associated with the measured phase difference, into which the counted number of clock-signal pulses falls, and computing the time-interval duration by adjusting by the measured phase difference the coarse duration associated with the identified group.

17. A method of measuring the duration of an interval defined by a start trigger and a stop trigger, the method comprising the steps of:

(A) providing a clock signal comprising pulses that occur at a predetermined frequency;

(B) providing at least one sinusoidal reference signal whose value is a predetermined periodic function of time synchronous with the clock signal;

(C) receiving start and stop triggers;

(D) measuring the value of each said reference signal at the occurrence of the start trigger;

(E) counting the number of pulses of the clock signal that occur between the start and stop triggers;

(F) measuring the value of the at least one reference signal at the occurrence of the stop trigger;

(G) applying the inverse of the predetermined function to the measured reference-signal values to determine the difference between the phase at the start trigger and the phase at the stop trigger of each said reference signal;

(H) computing the duration of the time interval between the start trigger and the stop trigger from the counted number of clock-signal pulses and the determined phase difference; and (I) generating a duration signal indicative of the duration thus computed.

18. A method as defined in claim 17 wherein:

(A) the step of providing at least one reference signal comprises providing first and second reference signals of the same frequency, each reference signal being synchronous with the clock signal but out of phase with the other reference signal;

(B) the step of measuring the value of the at least one reference signal at the occurrence of the start trigger comprises measuring the values of the first and second reference signals at the occurrence of the start trigger;

(C) the step of measuring the value of the at least one reference signal at the occurrence of the stop trigger comprises measuring the values of the first and second reference signals at the occurrence of the stop trigger; and (D) the step of applying the inverse function to the measured reference values comprises applying the inverse function to quantities including (i) the value of the first reference signal at the occurrence of at least one of the start trigger and the stop trigger and (ii) the value of the second reference signal at the occurrence of at least the other of the start trigger and the stop trigger.

19. A method as defined in claim 18 wherein the frequency of the clock signal is a multiple of that of the reference signal.

20. A method as defined in claim 19 wherein:

(A) the method further comprises associating a plurality of predetermined groups of possible numbers of clock pulses with each value of phase difference and associating a single coarse duration with each group; and (B) the duration-computing step comprises identifying the group, associated with the measured phase difference, into which the counted number of clock-signal pulses falls and adjusting by the measured phase difference the coarse duration associated with the identified group.

21. A method as defined in claim 17 wherein the frequency of the clock signal is a multiple of that of the sinusoidal reference signal.

22. A method as defined in claim 21 wherein:

(A) the method further comprises associating a plurality of predetermined groups of possible numbers of clock pulses with each value of phase difference and associating a single coarse duration with each group; and (B) the duration-computing step comprises identifying the group, associated with the measured phase difference, into which the counted number of clock-signal pulses falls and adjusting by the measured phase difference the coarse duration associated with the identified group.

23. For measuring the duration of an interval defined by a start trigger and a stop trigger, an apparatus comprising:

(A) a clock for generating pulses that occur with a predetermined frequency;

(B) a reference-signal source providing at least one reference signal whose value is a predetermined periodic function of time synchronous with the clock signal;

(C) means for receiving the start and stop triggers;

(D) analog-to-digital-converter means, responsive to the means for receiving start and stop triggers, for receiving the at least one reference signal and measuring values thereof at the occurrences of the start and stop triggers and generating converter outputs representative thereof;

(E) a counter for counting the number of pulses of the clock signal that occur between the start and stop triggers and generating a counter output representative thereof; and (F) calculation means, responsive to the converter and counter outputs, for applying the inverse of the predetermined function to the converter outputs, making a determination of the difference between the phase at the start trigger and the phase at the stop trigger of each said reference signal, computing the duration of the time interval between the start trigger and the stop trigger from the counter output and the determined phase difference, and generating a duration signal representative of the duration thus computed.

24. An apparatus as defined in claim 23 wherein:

(A) the reference-signal source comprises means for providing first and second reference signals of the same frequency synchronous with the clock signal but out of phase with each other;

(B) the analog-to-digital-converter means measures the values of the first and second reference signals at the occurrences of the start and stop triggers; and (C) the calculation means comprises means for making the phase-difference determination by applying the inverse function to quantities including (i) the value of the first reference signal at the occurrence of at least one of the start trigger and the stop trigger and (ii) the value of the second reference signal at the occurrence of at least the other of the start trigger and the stop trigger.

25. An apparatus as defined in claim 24 wherein the clock generates a clock signal whose frequency is a multiple of the frequency of the reference signal.

26. An apparatus as defined in claim 25 wherein the calculation means comprises means for associating a plurality of predetermined groups of possible numbers of clock pulses with each value of phase difference and associating a single coarse duration with each group, identifying the group, associated with the measured phase difference, into which the counted number of clock-signal pulses falls, and computing the time-interval duration by adjusting by the measured phase difference the coarse duration associated with the identified group.

27. An apparatus as defined in claim 23 wherein the clock generates a clock signal whose frequency is a multiple of the frequency of the reference signal.

28. An apparatus as defined in claim 27 wherein the calculation means comprises means for associating a plurality of predetermined groups of possible numbers of clock pulses with each value of phase difference and associating a single coarse duration with each group, identifying the group, associated with the measured phase difference, into which the counted number of clock-signal pulses falls, and computing the time-interval duration by adjusting by the measured phase difference the coarse duration associated with the identified group.

* * * * *